US010254391B2

(12) United States Patent
Shin et al.

(10) Patent No.: US 10,254,391 B2
(45) Date of Patent: Apr. 9, 2019

(54) RADAR DETECTOR FOR RECOGNIZING USER'S MOTION

(71) Applicant: JJ CORP, Ansan-si (KR)

(72) Inventors: Jin Woo Shin, Seongnam-si (KR); Hyun Taek Lee, Gwangmyeong-si (KR); Heung Chul Jang, Gwangmyeong-si (KR); Sang Won Eum, Gunpo-si (KR)

(73) Assignee: JJ CORP, Ansan-si (KR)

( * ) Notice: Subject to any disclaimer, the term of this patent is extended or adjusted under 35 U.S.C. 154(b) by 21 days.

(21) Appl. No.: 15/118,248

(22) PCT Filed: Oct. 26, 2015

(86) PCT No.: PCT/KR2015/011313
§ 371 (c)(1),
(2) Date: Aug. 11, 2016

(87) PCT Pub. No.: WO2016/099026
PCT Pub. Date: Jun. 23, 2016

(65) Prior Publication Data
US 2017/0299710 A1 Oct. 19, 2017

(30) Foreign Application Priority Data

Dec. 15, 2014 (KR) .......................... 10-2014-0180060
Oct. 6, 2015 (KR) .......................... 10-2015-0140231

(51) Int. Cl.
*G01S 13/56* (2006.01)
*G01S 7/06* (2006.01)
(Continued)

(52) U.S. Cl.
CPC .............. *G01S 13/56* (2013.01); *G01S 7/022* (2013.01); *G01S 7/06* (2013.01); *G01S 13/86* (2013.01);
(Continued)

(58) Field of Classification Search
CPC ........ G01S 13/56; G01S 13/86; G01S 13/886; G01S 17/026; G01S 19/13; G01S 7/022; G01S 7/06
(Continued)

(56) References Cited

U.S. PATENT DOCUMENTS

2012/0268306 A1* 10/2012 Coburn .................. G01S 7/022
342/20
2014/0347483 A1 11/2014 Nakanishi et al.
2016/0187461 A1* 6/2016 Orr ......................... G01S 7/022
342/20

FOREIGN PATENT DOCUMENTS

KR 20080075732 8/2008
KR 100930288 12/2009
(Continued)

OTHER PUBLICATIONS

International Search Report—PCT/KR2015/011313 dated Feb. 15, 2016.

*Primary Examiner* — Timothy A Brainard
(74) *Attorney, Agent, or Firm* — Cantor Colburn LLP

(57) ABSTRACT

Provided is a radar detector for detecting and recognizing, as a control signal, a hand gesture or a motion of a user and transferring the same to a peripheral device. The radar detector utilizes position information of GPS or GLONASS by additionally mounting a GPS receiving unit to the radar detector so as to amend malfunctions of the radar detector in environments in which interference from undesired signals may be received, such as areas of heavy jamming, downtown areas where various signals are generated, etc., and to enable a user to arbitrarily add (or delete) a notification refusal area or a notification area. The radar detector is expected to contribute to safe driving by increasing control convenience of a driver and preventing traffic accidents.

16 Claims, 10 Drawing Sheets

(51) Int. Cl.
*G01S 13/86* (2006.01)
*G01S 13/88* (2006.01)
*G01S 19/13* (2010.01)
*G01S 17/02* (2006.01)
*G01S 7/02* (2006.01)

(52) U.S. Cl.
CPC .......... *G01S 13/886* (2013.01); *G01S 17/026* (2013.01); *G01S 19/13* (2013.01)

(58) Field of Classification Search
USPC .......................................................... 342/28
See application file for complete search history.

(56) References Cited

FOREIGN PATENT DOCUMENTS

KR            101017013        2/2011
KR            101095132      12/2011

* cited by examiner

IR _SENSOR

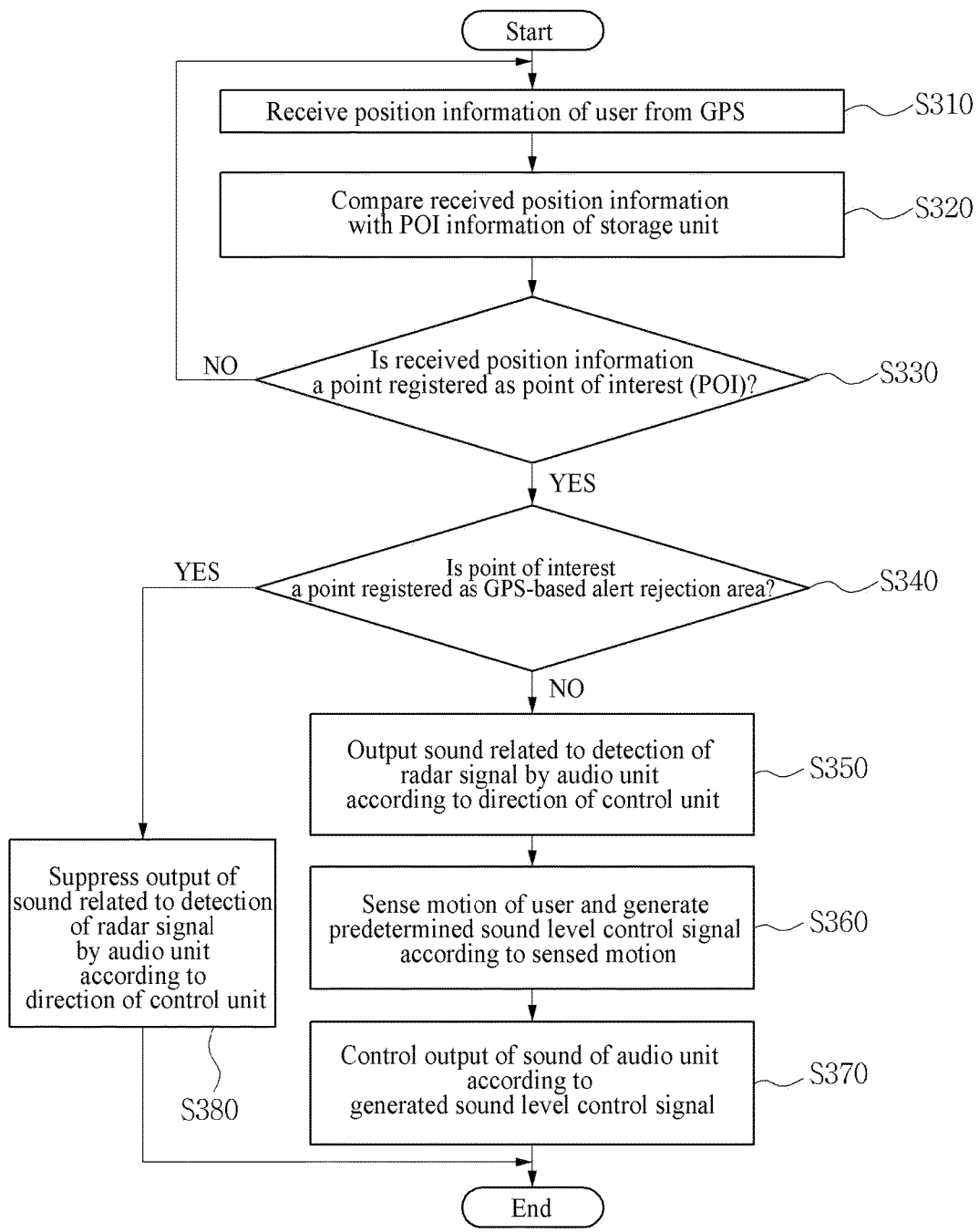

RADAR DETECTOR FOR RECOGNIZING USER'S MOTION

TECHNICAL FIELD

The present invention relates to an electronic device attached to a vehicle, and more specifically, to a radar detector.

BACKGROUND ART

Advanced countries such as USA, Japan and the like or other countries make a lot of efforts for the sake of safe driving of vehicles making use of various kinds of speed meters using microwaves or laser beams, i.e., radar, and safety alert transmitters for informing various situations of a road.

Particularly, although speed meters and signal detectors are currently used for traffic enforcement purpose in some countries, the speed meters and the signal detectors are permitted to be used as legal devices for helping safe driving in USA, Japan and the like, and use of the speed meters and the signal detectors tends to be legalized across the world.

With regard to the radar detector inducing safe driving of vehicles by detecting various signals as described above, various studies and patent applications are under progress even in Korea as is exemplified in the documents of the prior art as described below.

The documents of the prior art exemplified below are related to techniques for adding convenience to radar and/or a radar detector using a laser and also disclose basic techniques of the radar and the radar detector for detecting laser beams.

The radar detectors have been ceaselessly developed to detect various kinds of speed meters and inform a driver of road situations. However, previous studies are mainly focused on detecting speed meters and extending sensing distance.

A radio frequency band of radar applied to the speed meters is an X band (10.525 GHz±25 MHz), a K band (24.15 GHz±100 MHz) or a KA band (34.7 GHz±1,300 MHz), and in the case of a laser, a laser wavelength of 904 nm having a bandwidth of 33 MHz is applied.

As is well-known how dangerous it is to handle a navigator or a cellular phone while driving, in the case a radar detector, a driver's behavior of lowering audio sound or operating various functions using a button unit 600 while driving may act as a factor inviting a great danger to safe driving of the driver according to road conditions and driving situations. Particularly, latest vehicles have a serious problem in safety such that since the distance between the driver's seat and a device (the radar detector) placed on the dashboard or the windshield glass is long, movement of a driver for handling the radar detector increases, and keeping eyes ahead is neglected or even the movement can be applied to the steering wheel in the process of applying a handling force.

In the prior art, measures required for safety of a user when a driver should operate a radar detector while driving a vehicle are insufficient. When the radar detector senses a speed sensor or aurally informs the driver of road conditions or states, if the aural signal is too loud or lasts for an extended period of time, it may act as a factor hindering the driving.

In the prior art, a general radar detector is provided with separate buttons for decreasing the volume or performing a mute function so that a driver may not be hindered. Therefore, the driver decreases the volume or turns on the mute function by handling a corresponding button while driving.

Like this, an operation of handling (driving) the radar detector by a driver acts as a factor hindering safe driving of the driver. Although there are cases when an auto-mute function is applied for the convenience of drivers, it is insufficient to satisfy the requests and characteristics of various drivers since the auto-mute function is a convenience function executed only when a predetermined time is elapsed.

In addition, if the inner space of a vehicle is large or the vehicle is a large vehicle, the radar detector is placed at a place hard to operate by the driver or installed at a hidden place in many cases. Even in this case, the problem of threatening safety of a vehicle may occur due to unnatural handling of a button by the driver.

In addition, a conventional radar detector has a problem in that it cannot distinguish a normal signal (e.g., an electromagnetic signal or the like of a speed meter or a safety alert transmitter) from undesired signals in an environment interfered by the undesired signals, such as an area of severe radio interference, a downtown area where various signals are generated or the like, and malfunctions of the radar detector frequently occur due to the interference of the signals.

DISCLOSURE OF INVENTION

Technical Problem

Therefore, the present invention has been made in view of the above problems, and it is an object of the present invention to provide a radar detector, which can detect and recognize a hand gesture or a motion of a user as a control signal and transfer the control signal to a peripheral device.

Another object of the present invention is to provide a radar detector which allows a user to arbitrarily add or delete an alert area or an alert rejection area with reference to position information of a GPS receiving unit.

Additional features and advantages of the present invention will be described below, and part of them will be clarified by the description or fully understood through the execution of the present invention. The objects and other advantages of the present invention will be implemented by the structure recited in the claims, as well as the description disclosed below and the added drawings.

Technical Solution

To accomplish the above objects, according to one aspect of the present invention, there is provided a radar detector comprising: a GPS receiving unit for receiving position information of a user; a radar unit for detecting a radar signal; a signal processing unit for converting, if the radar unit detects the radar signal, the detected radar signal into a digital signal; a control unit for determining whether or not the digital signal is a signal desired to be detected, by analyzing the received position information and the signal converted by the signal processing unit; a display unit for expressing a predetermined message related to detection of the radar signal or an operation performed by a GPS signal according to a direction of the control unit; an audio unit for outputting a sound according to the determination of the control unit; a sensor unit for sensing a motion of the user and generating a sound level control signal or a predetermined control signal according to the sensed motion; and a storage unit for storing information on a false alert rejection area, a GPS-based alert rejection area and a user-registered alert area, in which the control unit turns up or down output of the sound of the audio unit according to the sound level control signal of the sensor unit, and newly registers or deletes information of the storage unit according to the predetermined control signal of the sensor unit.

Preferably, the storage unit includes: a first alert rejection area storage unit for storing information on areas determined by the user as if a radar signal is not detected although the radar signal is actually detected in a corresponding area (hereinafter, referred to as false alert rejection areas); a second alert rejection area storage unit for storing information on areas determined by the user as if the areas do not correspond to a point of interest (POI) although the corresponding areas are actually designated as a point of interest with reference to the position information of the GPS receiving unit (hereinafter, referred to as GPS-based alert rejection areas); and a user location storage unit for storing information on areas determined by the user that an alert is needed in the corresponding areas (hereinafter, referred to as user-registered alert areas).

Preferably, the control unit determines whether or not the digital signal is a signal desired to be detected, by analyzing the converted digital signal, loads information on the false alert rejection area from the storage unit, if the digital signal is determined as a signal desired to be detected, determines whether or not the user is currently passing through the false alert rejection area with reference to the received position information of the user, and outputs an audio signal of a mute state, if it is determined that the user is currently passing through the false alert rejection area.

Preferably, the control unit loads information on the user-registered alert area from the storage unit, periodically compares the received position information of the user with the user-registered alert area to confirm whether or not the user is currently passing through the user-registered alert area, and outputs a predetermined message informing that the user is currently passing through the user-registered alert area as an audio signal, regardless of whether or not the radar unit operates, if it is confirmed that the user is currently passing through the user-registered alert area.

Preferably, the control unit loads information on the GPS-based alert rejection area from the storage unit, confirms whether or not the user is currently passing through a point of interest (POI) with reference to the received position information of the user, determines whether or not the point of interest corresponds to the GPS-based alert rejection area, if the user is currently passing through the point of interest (POI), and outputs an audio signal of a mute state, if the point of interest corresponds to the GPS-based alert rejection area.

According to another aspect of the present invention, there is provided a sound control method of a radar detector, the method comprising the steps of: receiving position information of a user through a GPS receiving unit; converting, if a radar unit detects a radar signal, the detected radar signal into a digital signal; determining, by a control unit, whether or not the digital signal is a signal desired to be detected, by analyzing the received position information and the converted digital signal; outputting a predetermined message according to the determination of the control unit as an audio signal; sensing, by a sensor unit, a motion of the user and generating a sound level control signal or a predetermined control signal according to the sensed motion; and turning up or down, by the control unit, output of a sound of an audio unit according to the sound level control signal of the sensor unit, and newly registering or deleting information of a storage unit according to the predetermined control signal of the sensor unit.

Preferably, the step of determining whether or not the digital signal is a signal desired to be detected includes the steps of: determining whether or not the digital signal is a signal desired to be detected, by analyzing the converted digital signal; loading, by the control unit, information on a false alert rejection area from the storage unit, if the digital signal is determined as a signal desired to be detected; determining whether or not the user is currently passing through the false alert rejection area with reference to the received position information of the user; and outputting, by the control unit, an audio signal of a mute state, if it is determined that the user is currently passing through the false alert rejection area.

Preferably, the step of determining whether or not the digital signal is a signal desired to be detected includes the steps of: loading, by the control unit, information on a user-registered alert area from the storage unit; periodically comparing the received position information of the user with the user-registered alert area to confirm whether or not the user is currently passing through the user-registered alert area; and outputting a predetermined message informing that the user is currently passing through the user-registered alert area as an audio signal, regardless of whether or not the radar unit operates, if it is confirmed that the user is currently passing through the user-registered alert area.

Preferably, the step of determining whether or not the digital signal is a signal desired to be detected includes the steps of: loading, by the control unit, information on a GPS-based alert rejection area from the storage unit; confirming whether or not the user is currently passing through a point of interest (POI) with reference to the received position information of the user; determining whether or not the point of interest corresponds to the GPS-based alert rejection area, if the user is currently passing through the point of interest (POI); and outputting, by the control unit, an audio signal of a mute state, if the point of interest corresponds to the GPS-based alert rejection area.

Advantageous Effects

The present invention implements a radar detector which can be easily handled by a vehicle driver while driving through a simple motion of a hand gesture without hindering safe driving of a vehicle when an output sound of sensing radar (or a laser) is not needed.

In addition, the present invention implements a radar detector which can enhance convenience of using a product and guarantee safety of a user while driving by designing a new method and sensor device for switching an output sound of the radar detector to a mute state or reducing the output sound to a small sound of a predetermined level.

In addition, the present invention may correct malfunctions of a radar detector and allow a user to arbitrarily add (or delete) an alert rejection area or an alert area in an environment interfered by undesired signals, such as an area of severe radio interference, a downtown area where various signals are generated or the like, by additionally mounting a GPS receiving unit to the radar detector and utilizing position information of a GPS or a GLONASS.

The radar detector according to the present invention is expected to enhance convenience of a driver in handling the radar detector and contribute to safe driving by preventing traffic accidents.

BRIEF DESCRIPTION OF THE DRAWINGS

FIG. 10 is a flowchart illustrating the operation of a radar detector in a GPS-based alert rejection area.

BEST MODE FOR CARRYING OUT THE INVENTION

Hereinafter, preferred embodiments of the present invention will be described with reference to the drawings.

If a signal is received through a radar unit (or a laser unit), a radar detector outputs a sound of a predetermined message, and in some cases, the sound acts as a noise to a user (e.g., a driver) since the sound output events are frequently generated. The present invention implements a radar detector which can reduce the sound level of the radar detector or operate a mute function through a simple action or motion of the user when it is desired to block output of the sound of the radar detector generated so frequently.

In addition, the present invention corrects radar detecting errors generated in a registered area by registering areas where a signal detection error of the radar detector occurs, in advance or as needed, with reference to the position information of a GPS receiving unit, as well as a detection signal of the radar unit (or the laser unit). In addition, a user is allowed to arbitrarily add or delete an alert rejection area or an alert area.

Figure 1:
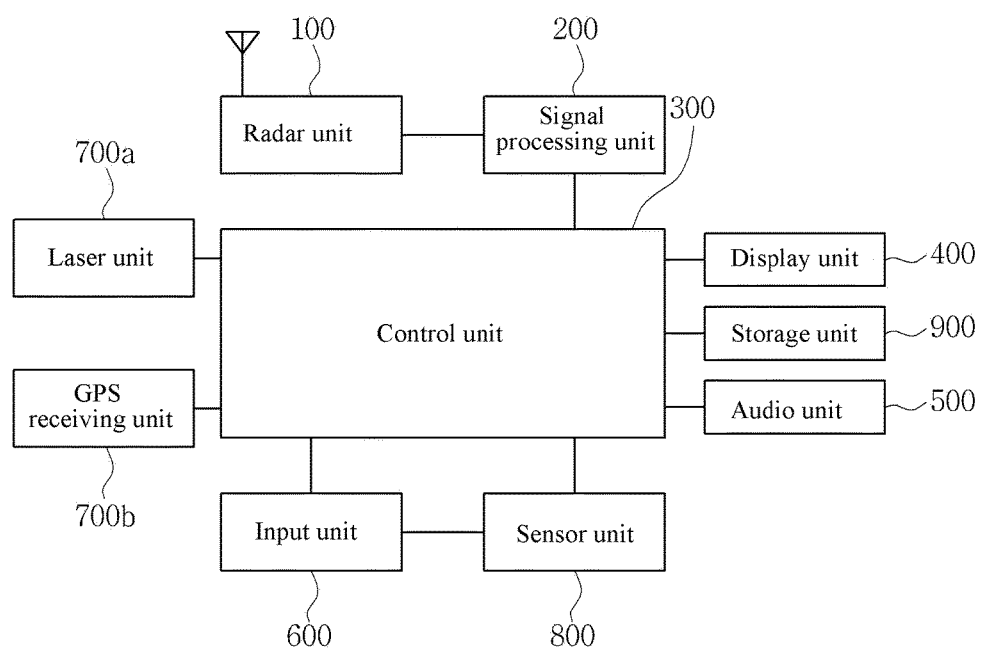
FIG. 1 is a block diagram showing a radar detector according to the present invention.

FIG. 1 is a block diagram showing a radar detector according to the present invention.

As shown in FIG. 1, a radar detector according to the present invention is configured to include a radar unit 100, a signal processing unit 200, a control unit 300, a display unit 400, an audio unit 500, an input unit 600, a laser unit 700a, a GPS receiving unit 700b, a sensor unit 800 and a storage unit 900.

The radar unit 100 receives a radar signal (e.g., an X, K or KA signal).

A radio frequency band of a radar signal applied to a speed meter is an X band (10.525 GHz±25 MHz), a K band (24.15 GHz±100 MHz) or a KA band (34.7 GHz±1,300 MHz), and the radar unit 100 detects a radar signal of X band, K band or KA band.

The laser unit 700a receives a laser signal. A laser signal applied to a speed meter is a signal of a 904 nm laser wavelength having a bandwidth of 33 MHz.

The GPS receiving unit 700b receives position information of a user. The GPS receiving unit 700b receives a signal having position information from satellites of a global positioning system (GPS) or GLONASS. Then, the GPS receiving unit 700b transfers the received position information to the control unit 300.

The signal processing unit 200 converts the radar signal (or the laser signal) received through the radar unit 100 or the laser unit 700a into a digital signal and transfers the digital signal to the control unit 300.

The control unit 300 receives an output signal of the signal processing unit 200 and determines whether the received signal is a signal of a speed meter or a safety alert transmitter through a predetermined analysis procedure.

If it is determined that the digital signal is an electromagnetic signal of a speed meter or a safety alert transmitter, the control unit 300 outputs a visual and/or aural message informing that a corresponding signal is received, through the display unit 400 or the audio unit 500. Hereinafter, the electromagnetic signal of the speed meter or the safety alert transmitter is simply referred to as a 'radar signal' for the convenience of explanation.

In addition, the control unit 300 visually and/or aurally outputs a distance reaching to the speed meter or the safety alert transmitter to be appeared on the route through the display unit 400 and the audio unit 500 with reference to the position information received by the GPS receiving unit 700b. First, the control unit 300 detects current position information of the user with reference to the position information received by the GPS receiving unit 700b and detects a position of the speed meter or the safety alert transmitter around the route. Then, the control unit 300 outputs a distance reaching to the speed meter or the safety alert transmitter to be appeared on the route through the display unit 400 and the audio unit 500.

At this point, if the user (e.g., a driver) desires not to output an aural expression, i.e., the speaker sound of the audio unit 500, or to control position information, i.e., to register or delete the position information obtained through the GPS receiving unit 700b, as needed, the user takes an action or a motion of moving a hand near the sensor unit 800, and the sensor unit 800 senses the hand gesture or the motion of the user (e.g., the driver) and outputs a predetermined control signal according thereto (e.g., a signal for controlling the output level of the audio (e.g., an up/down command, a mute command or the like), registering a predetermined area, deleting a previously registered area or the like).

Then, the output signal of the sensor unit 800 is transferred to the control unit 300, and the control unit 300 increases or decreases the speaker sound of the audio unit 500 or performs the mute function on the sound according to the output signal.

The control unit 300 is capable of transmitting an up/down command of digital volume to the audio unit 500 through a predetermined programmatic routine (e.g., a volume control routine), and a complete mute state, i.e., a silent state, can be accomplished through a control method of sending a volume down command (e.g., a volume control routine) until the silent state is attained. In addition, the control unit 300 may transmit a command for registering a predetermined area or deleting a previously registered area.

The control unit 300 of the present invention controls the operation of the radar detector in the following three event situations with reference to the position information received by the GPS receiving unit 700, together with the signal received through the radar unit 100 or the laser unit 700a (hereinafter, referred to as a 'radar signal').

A first event situation is a case of moving to an area determined by a user as if a radar signal is not detected although the radar signal is actually detected therein (hereinafter, referred to as a 'false alert rejection area'), a second event situation is a case of moving to an area determined by the user as if the area does not correspond to a point of interest (POI) although the area is actually designated as a point of interest with reference to the position information of the GPS receiving unit 700*b* (hereinafter, referred to as a 'GPS-based alert rejection area'), and a third event situation is a case of moving to an area determined by a user that an alert is needed (hereinafter, referred to as a 'user-defined alert area').

<False Alert Rejection Area Using Motion>

The first event situation is recognizing that although the radar detector detects a radar signal, the radar signal is regarded as being detected since actually the radar detector generates an error. Although it is unknown whether the radar signal is a local problem or a problem of a radar signal which generates interference, there are occasions in which such an operation error of the radar detector frequently occurs in a specific area.

In this case, the user registers the corresponding area as a false alert rejection area. In addition, if it is confirmed that the user is positioned in the false alert rejection area, the control unit 300 suppresses output of the sound of the audio unit 500.

The control unit 300 of the first event situation first receives an output signal of the signal processing unit 200 and determines whether the received signal is a signal of a speed meter or a safety alert transmitter through a predetermined analysis procedure.

If it is determined that the received signal is an electromagnetic signal of a speed meter or a safety alert transmitter, the control unit 300 loads information on the false alert rejection area from the storage unit 900. Then, the control unit 300 determines whether or not the user is currently passing through the false alert rejection area with reference to the position information of the user received by the GPS receiving unit 700*b*.

If it is determined that the user is currently passing through the false alert rejection area, the control unit 300 outputs an aural message informing that a corresponding signal (e.g., an electromagnetic signal of a speed meter or a safety alert transmitter) is sensed as a mute state through the audio unit 500, or the control unit 300 may block output of the aural message.

<GPS(POI)-Based Alert Rejection Area Using Motion>

The second event situation relates to a case in which an area designated as a point of interest (POI) in a GPS information database actually does not correspond to a point of interest (e.g., a point where a speed meter or a safety alert transmitter is installed). In this case, the user registers the corresponding area as a GPS-based alert rejection area. Then, if it is confirmed that the user is positioned in the GPS-based alert rejection area, the control unit 300 suppresses output of the sound of the audio unit 500.

The control unit 300 of the second event situation first loads information on the GPS-based alert rejection area from the storage unit 900 and confirms whether or not the user is currently passing through the point of interest (e.g., a point where a speed meter or a safety alert transmitter is installed) by periodically checking the position information of the user received by the GPS receiving unit 700*b*.

If it is confirmed that the user is currently passing through the point of interest (POI), the control unit confirms whether or not the point of interest (POI) is a point where a speed meter or a safety alert transmitter is actually installed by checking whether or not the point of interest corresponds to the GPS-based alert rejection area.

If the point of interest (POI) is not a point where a speed meter or a safety alert transmitter is actually installed as a result of the confirmation, i.e., the point of interest (POI) corresponds to the GPS-based alert rejection area, the control unit 300 outputs an aural message informing that the user is currently passing through the point of interest (e.g., a point where a speed meter or a safety alert transmitter is installed) as a mute state through the audio unit 500, or the control unit 300 blocks output of the aural message.

<User Location Using Motion>

The third event situation relates to a case of registering an area selected by the user as a user-registered alert area with reference to the position information of the user received by the GPS receiving unit 700*b*, regardless of whether or not the radar detector detects a radar signal. If it is confirmed that the user is positioned in the user-registered alert area, the control unit 300 outputs a sound according thereto through the audio unit 500.

The control unit 300 of the third event situation first loads information on the user-registered alert area from the storage unit 900 and confirms whether or not the user is currently passing through the user-registered alert area by periodically comparing the position information of the user received by the GPS receiving unit 700*b* with the user-registered alert area.

If it is confirmed that the user is currently passing through the user-registered alert area, the control unit 300 outputs an aural message informing that the user is currently passing through the user-registered alert area through the audio unit 500, regardless of whether or not the radar detector detects a radar signal.

If a signal is received through the radar unit (or the laser unit), the audio unit 500 outputs a predetermined message or sound (e.g., a voice, a warning sound, a beep or the like) related to the radar signal detection according to the direction of the control unit 300.

The display unit 400 outputs a message or information processed by the radar detector according to the direction of the control unit 300. For example, the display unit 400 displays a user interface (UI) or a graphic user interface (GUI) related to detection of a signal (e.g., a radar signal, a laser signal or the like). The display unit 400 includes at least one of a liquid crystal display, a thin film transistor liquid crystal display, an organic light emitting diode, a flexible display and a three-dimensional display.

The input unit 600 generates an input data for controlling operation of the radar detector according to input (handling) of the user. The input unit 600 may be configured of a keypad, a dome switch, a (resistive/capacitive) touchpad, a jogwheel, a switch, buttons or the like.

The sensor unit 800 senses a motion of the user and generates an output level control signal of the audio unit 500 according to the sensed motion. In addition, the sensor unit 800 generates a signal for registering a false alert rejection area, deleting a previously registered false alert rejection area, registering a user-defined alert area, deleting a previously registered user-defined alert area, registering a GPS-based alert rejection area, or deleting a previously registered GPS-based alert rejection area according to the sensed motion of the user.

If the user takes a promised motion, the sensor unit 800 generates various kinds of signals according to the motion of the user, and the control unit 300 adjusts the output level of the audio unit 500, and registers a specific area or deletes a previously registered area according to the signal generated by the sensor unit 800.

When an area is registered or deleted, the control unit 300 performs registration or deletion of an area corresponding to an event situation according thereto.

For example, if the sensor unit 800 senses a motion of the user and generates a signal for registering an area while the first event situation is in progress, the control unit 300 registers the current position as a false alert rejection area. Contrarily, if the sensor unit 800 generates a signal for deleting an area, the control unit 300 deletes storage information of a first alert rejection area storage unit which stores the current position as a false alert rejection area.

In addition, if the sensor unit 800 senses a motion of the user and generates a signal for registering an area while the second event situation is in progress, the control unit 300 registers the current position as a GPS-based alert rejection area. Contrarily, if the sensor unit 800 generates a signal for deleting an area, the control unit 300 deletes storage information of a second alert rejection area storage unit which stores the current position as a GPS-based alert rejection area.

In addition, if the sensor unit 800 senses a motion of the user and generates a signal for registering an area while the third event situation is in progress, the control unit 300 registers the current position as a user-registered alert area. Contrarily, if the sensor unit 800 generates a signal for deleting an area, the control unit 300 deletes storage information of a user location storage unit which stores the current position as a user-registered alert area.

The sensor unit 800 according to the present invention may sense an action or a motion of the user by employing an infrared human body sensing sensor or a proximity sensor.

The storage unit 900 stores information on the false alert rejection area, the GPS-based alert rejection area and the user-registered alert area, and to this end, it is configured to include the first alert rejection area storage unit, the second alert rejection area storage unit and the user location storage unit.

The first alert rejection area storage unit stores information on the areas determined by the user as if a radar signal is not detected although the radar signal is actually detected in a corresponding area, i.e., the false alert rejection areas.

The second alert rejection area storage unit stores information on the areas determined by the user as if the areas do not correspond to a point of interest (POI) although the corresponding areas are actually designated as a point of interest with reference to the position information of the GPS receiving unit 700*b*, i.e., the GPS-based alert rejection areas.

The user location storage unit stores information on the areas determined by the user as if a radar signal is detected therein although the radar signal is not detected in the corresponding areas, i.e., the user-registered alert areas.

Hereinafter, operation of the radar detector will be described in detail through an embodiment employing an infrared human body sensing sensor and an embodiment employing a proximity sensor.

Figure 2:
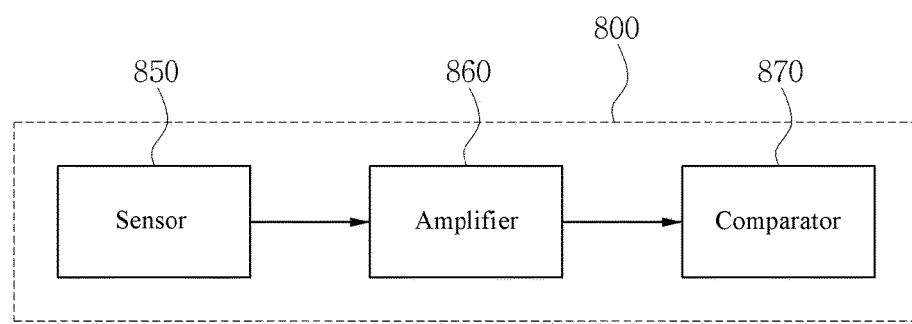
FIG. 2 is a block diagram showing a sensor unit according to an embodiment of the present invention.

FIG. 2 is a block diagram showing a sensor unit according to an embodiment of the present invention, which is configured by employing an infrared human body sensing sensor.

If an infrared sensor element senses a human body and generates a sensing voltage, the sensor unit 800 according to the embodiment amplifies the micro sensing voltage through an amplifier 840, converts the amplified voltage into a digital signal by applying the voltage to a comparator 870, and transfers the digital signal to the control unit 300.

As shown in FIG. 2, the sensor unit 800 is configured to include a sensor 850, an amplifier 860 and a comparator 870.

The sensor 850 is an infrared human body sensing sensor, which can sense a motion (a movement) of a user occurring around the radar detector by detecting an infrared signal generated from the human body.

The amplifier 860 amplifies the detected infrared signal.

The comparator 870 converts the amplified signal into a digital signal to send the amplified signal to the control unit 300.

Figure 3:
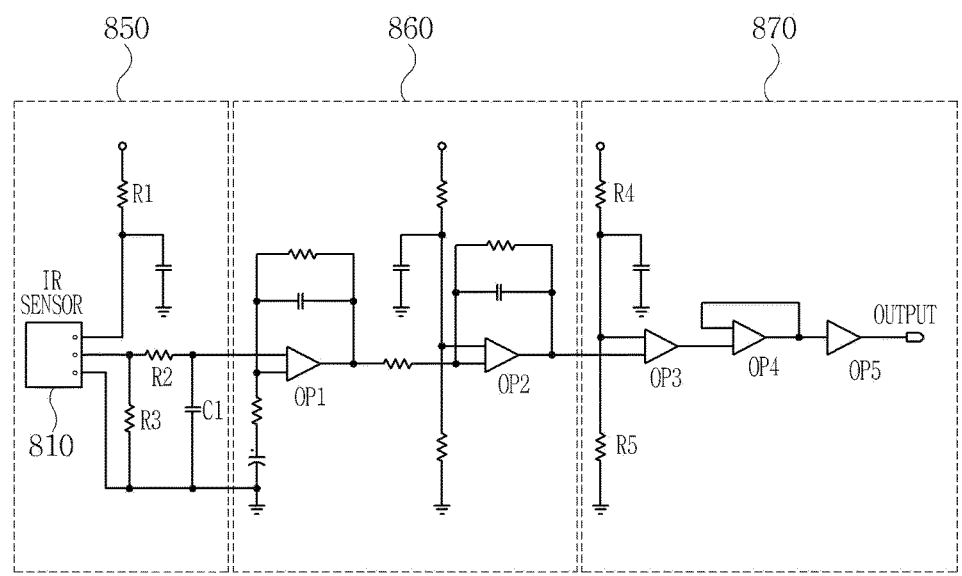
FIG. 3 is a circuit diagram showing a sensor unit according to the present invention.

FIG. 3 is a circuit diagram showing a sensor unit according to the present invention, which shows the circuit configuration of the elements 850, 860 and 870 configuring the sensor unit 600.

Figure 4:
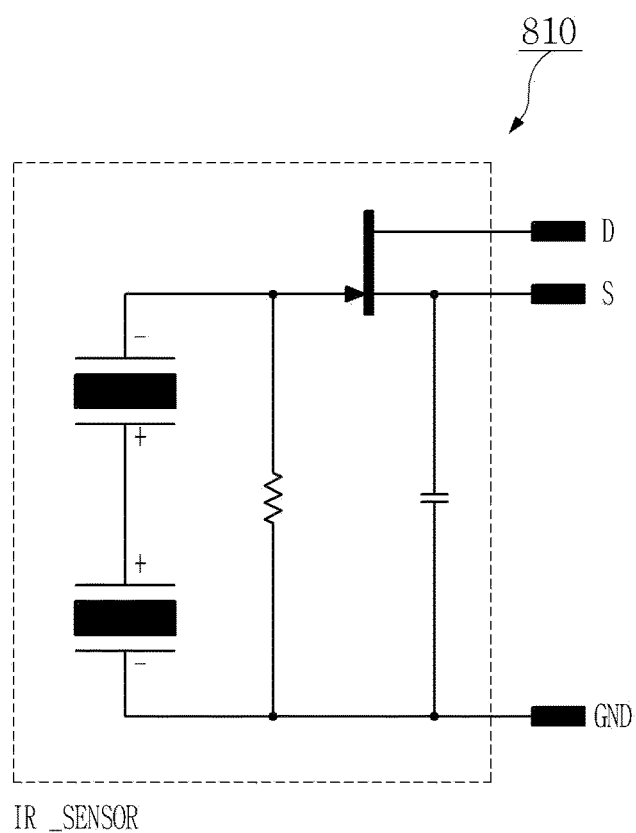
FIG. 4 is an exemplary view showing an infrared sensor element.

As shown in FIG. 3, resistor R1 is configured to set a drain voltage of the drain of an FET, and resistors R2 and R3 and capacitor C1 are configured to set an appropriate time constant while matching the output terminal of the infrared sensor element (IR SENSOR) 810 to the input terminal of a first amplifier (OP1) of the amplifier 860. The sensor unit 800 of the present invention is provided with the sensor 850 employing the infrared sensor element. FIG. 4 is an exemplary view showing the infrared sensor element.

The infrared sensor element 810 forms a structure of transferring, if an infrared signal generated from the human body is sensed, an electrical signal induced in the sensor element 810 to the FET inside thereof and outputting the signal to the outside of the sensor, as shown in FIG. 4.

Resistors R4 and R5 of FIG. 3 provide a reference voltage to an OP amplifier (OP3) of the comparator 870. Then, the comparator 870 compares the reference voltage with the voltage of the signal amplified by a second amplifier (OP2) and outputs a digital signal of the comparison value.

Figure 5:
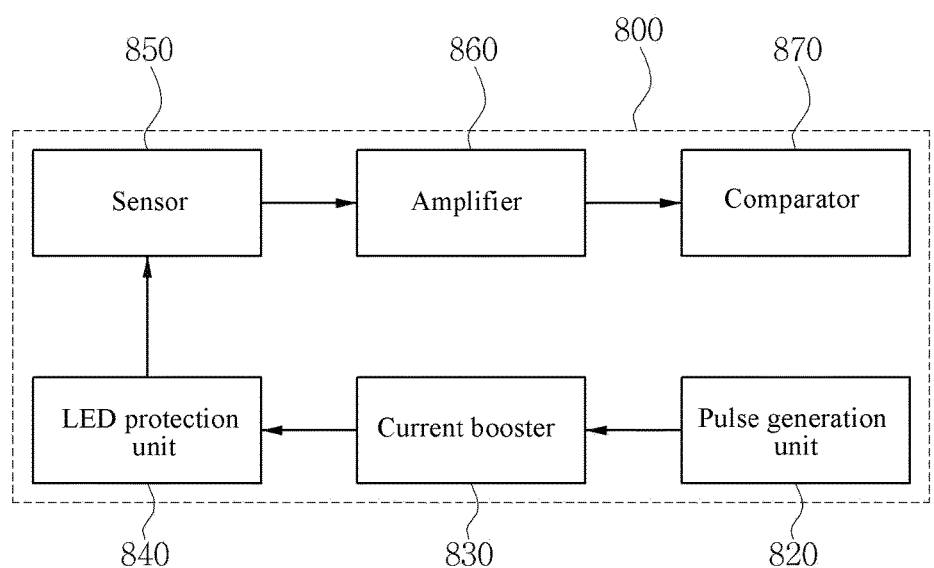
FIG. 5 is a block diagram showing a sensor unit according to another embodiment of the present invention.

FIG. 5 is a block diagram showing a sensor unit according to another embodiment of the present invention, which is configured by employing a proximity sensing photo sensor (hereinafter, referred to as a 'proximity sensor') which operates when a human body or an object approaches nearby.

As shown in FIG. 5, the sensor unit 800 according to the embodiment is configured to include a pulse generation unit 820, a current booster 830, an LED protection unit 840, a sensor 850, an amplifier 860 and a comparator 870.

The pulse generation unit 820 generates a pulse of a regular interval for on and off of a Light Emitting Diode (LED). The LED is turned on and off according to high and low signals of the pulse.

The current booster 830 operates the LED by increasing the current applied to the LED for smooth operation of the LED.

The LED protection unit 840 protects the LED from a pulse width of an unnecessarily long high value. If the LED is turned on too long, its operating lifespan can be reduced. When the pulse width of a high value is maintained for a long time unnecessarily, the LED protection unit 840 turns off the LED by blocking the current applied to the LED.

The sensor 850 is a proximity sensor which can sense a hand or the body of a user approaching the radar detector.

Figure 6:
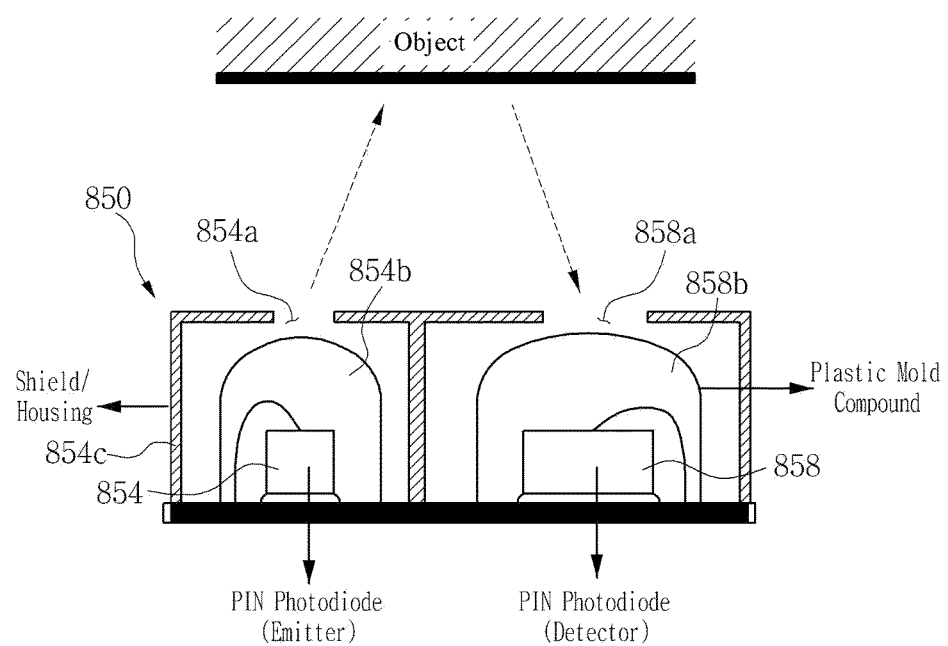
FIG. 6 is a detailed configurational view showing the structure of a proximity sensor.

The proximity sensor is a sensor for emitting an infrared LED ray and sensing an infrared (IR) optical pulse reflected and returning from an object (e.g., a hand of a driver) and is configured to include an emitter 854 and a detector 858 as shown in FIG. 6. FIG. 6 is a detailed configurational view showing the structure of a proximity sensor.

As shown in FIG. 6, while the emitter 854 and the detector 858 are covered by plastic mold mixtures 854*b* and 858*b*, neighborhoods thereof are surrounded by a casing 854*c* (shield or housing). At this point, the casing 854*c* has windows 854*a* and 858*a* formed on the top of the emitter 854 and the detector 858 to transmit and receive light, respectively.

The emitter 854 is an electrical-to-optical converter, which emits an infrared (IR) optical pulse.

Then, the detector 858 senses the IR optical pulse reflected by a shield object, i.e., a hand of a driver, or the surface thereof using a PIN optical diode.

If the IR optical pulse emitted through the emitter 854 arrives at the shield object (e.g., a hand of a driver) or the surface thereof at a sensing distance of about 15 Cm from the sensor 850, it is diffracted or reflected toward the detector 858. The detector 858 sensing the optical pulse generates optical current, converts the optical current into voltage through the resistors, and output the voltage.

The micro voltage output like this is amplified by the amplifier 860 and applied to the comparator 870. Then, the comparator 870 converts the amplified signal into a digital signal and transfers the digital signal to the control unit 300.

Figure 7:
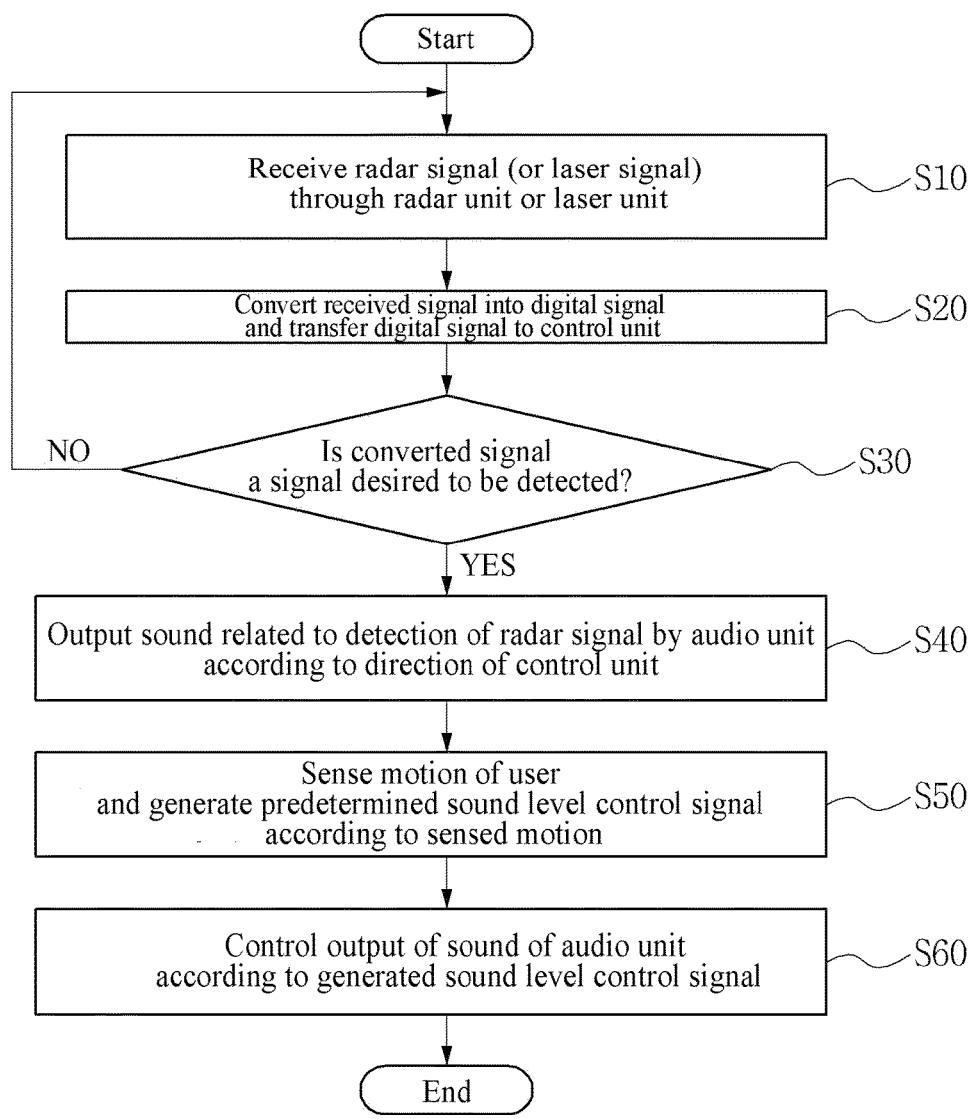
FIG. 7 is a flowchart illustrating the operation of a radar detector according to the present invention.

FIG. 7 is a flowchart illustrating the operation of a radar detector according to the present invention.

As shown in FIG. 7, first, the radar detector of the present invention receives a radar signal (or a laser signal) through the radar unit 100 or the laser unit 700*a* (step S10). Then, the radar detector converts the received signal into a digital signal and transfers the digital signal to the control unit 300 (step S20).

If the digital signal is transferred from the signal processing unit 200, the control unit 300 determines whether the digital signal is a signal of a speed meter or a safety alert transmitter through a predetermined analysis procedure (step S30).

If it is determined that the digital signal is an electromagnetic signal of a speed meter or a safety alert transmitter, the control unit 300 outputs a visual and/or aural message (or a sound) informing that the corresponding signal is received, through the display unit 400 or the audio unit 500 (step S40).

If an aural signal is output through the audio unit 500, a buzzer sound or a beep sound of high pitch is generated for fast recognition of a driver, and this sound of high pitch acts as a noise and hinders driving.

Like this, if the driver feels that driving is hindered or radar detecting confirmation is not needed, the driver only needs to control the audio unit 500 to lower the sound through the button unit 600, and the present invention allows the driver to control the audio unit 500 without contacting the button unit 600 through the sensor unit 800 having a function of sensing an action and a function of recognizing a motion of the driver, instead of controlling the audio unit 500 to lower the sound of the audio unit 500 through the button unit 600 as is done in the prior art.

The driver of the present invention may control (e.g., up/down or mute) the speaker sound of the audio unit 500 by taking an action of moving a hand or a specific motion near the sensor unit 800.

The sensor unit 800 according to the present invention senses a hand gesture or a motion of the user (e.g., the driver). Then, the sensor unit 800 outputs a predetermined control signal (e.g., a signal for controlling the output level of the audio (e.g., an up/down command, a mute command or the like)) according to the hand gesture or the motion of the user (e.g., the driver) (step S50).

Then, the control unit 300 controls output of the sound of the audio unit 500 according to the control signal (e.g., a signal for controlling the output level of the audio).

<False Alert Rejection Area Using Motion>

Figure 8:
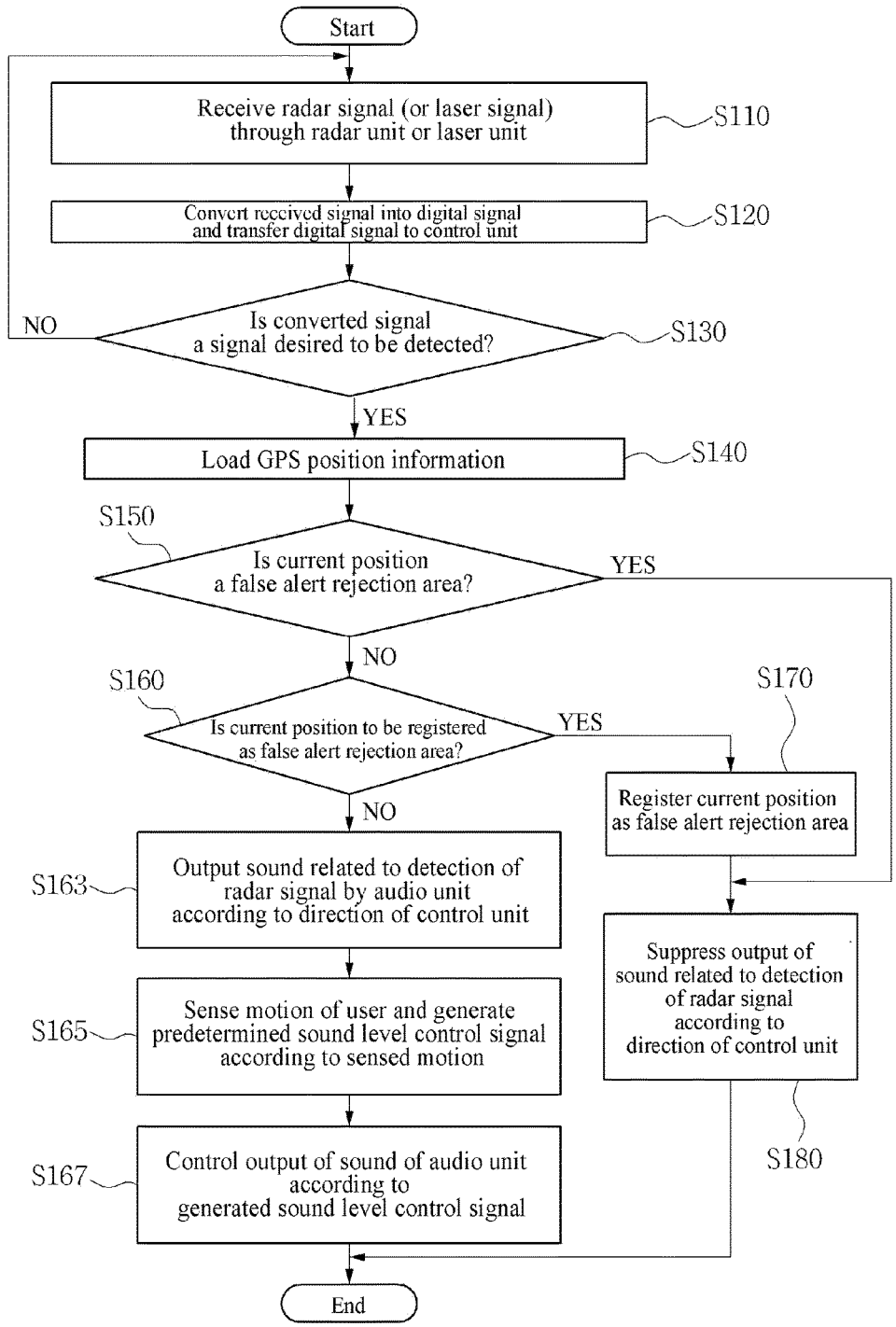
FIG. 8 is a flowchart illustrating the operation of a radar detector in a false alert rejection area.

FIG. 8 is a flowchart illustrating the operation of a radar detector in a false alert rejection area.

As shown in FIG. 8, first, the radar detector of the present invention receives a radar signal (or a laser signal) through the radar unit 100 or the laser unit 700*a* (step S110). Then, the radar detector converts the received signal into a digital signal and transfers the digital signal to the control unit 300 (step S120).

The control unit 300 determines whether or not the digital signal is a signal desired to be detected, by analyzing the converted digital signal, and if the digital signal is determined as a signal desired to be detected, the control unit 300 loads information on the false alert rejection area (steps S230 and S140).

Then, the position information of the user received by the GPS receiving unit 700*b* is compared with the false alert rejection area to determine whether or not they correspond to each other, and if the two pieces of information correspond to each other, the control unit 300 determines that the user is currently passing through the false alert rejection area (step S150).

Like this, if it is determined that the user is currently passing through the false alert rejection area, the control unit 300 outputs an aural message informing that a corresponding signal (e.g., an electromagnetic signal of a speed meter or a safety alert transmitter) is sensed as a mute state through the audio unit 500 (step S180). That is, the aural message is processed as mute.

Contrarily, if the two pieces of information do not correspond to each other in the comparison process, the control unit 300 inquires the user whether or not to register the current position as a false alert rejection area (step S160). Then, if the user desires to register the current position as a false alert rejection area, the control unit 300 registers the current position as a false alert rejection area and outputs an aural message informing that a corresponding signal (e.g., an electromagnetic signal of a speed meter or a safety alert transmitter) is sensed as a mute state (steps S170 and S180).

If the user does not desire to register the current position as a false alert rejection area at step S160, the control unit 300 normally outputs an aural message informing that a corresponding signal (e.g., an electromagnetic signal of a speed meter or a safety alert transmitter) is sensed through the audio unit 500 (step S163).

At this point, if the user (or the driver) takes an action of moving a hand or a specific motion near the sensor unit 800 to control (e.g., up/down or mute) the speaker sound of the audio unit 500, the sensor unit 800 senses the motion of the user and outputs a predetermined control signal according thereto (e.g., a signal for controlling the output level of the audio (e.g., an up/down command, a mute command or the like)) (step S165).

Then, the control unit 300 controls output of the sound of the audio unit 500 according to the control signal (e.g., a signal for controlling the output level of the audio) (step S167).

<User Location Using Motion>

Figure 9:
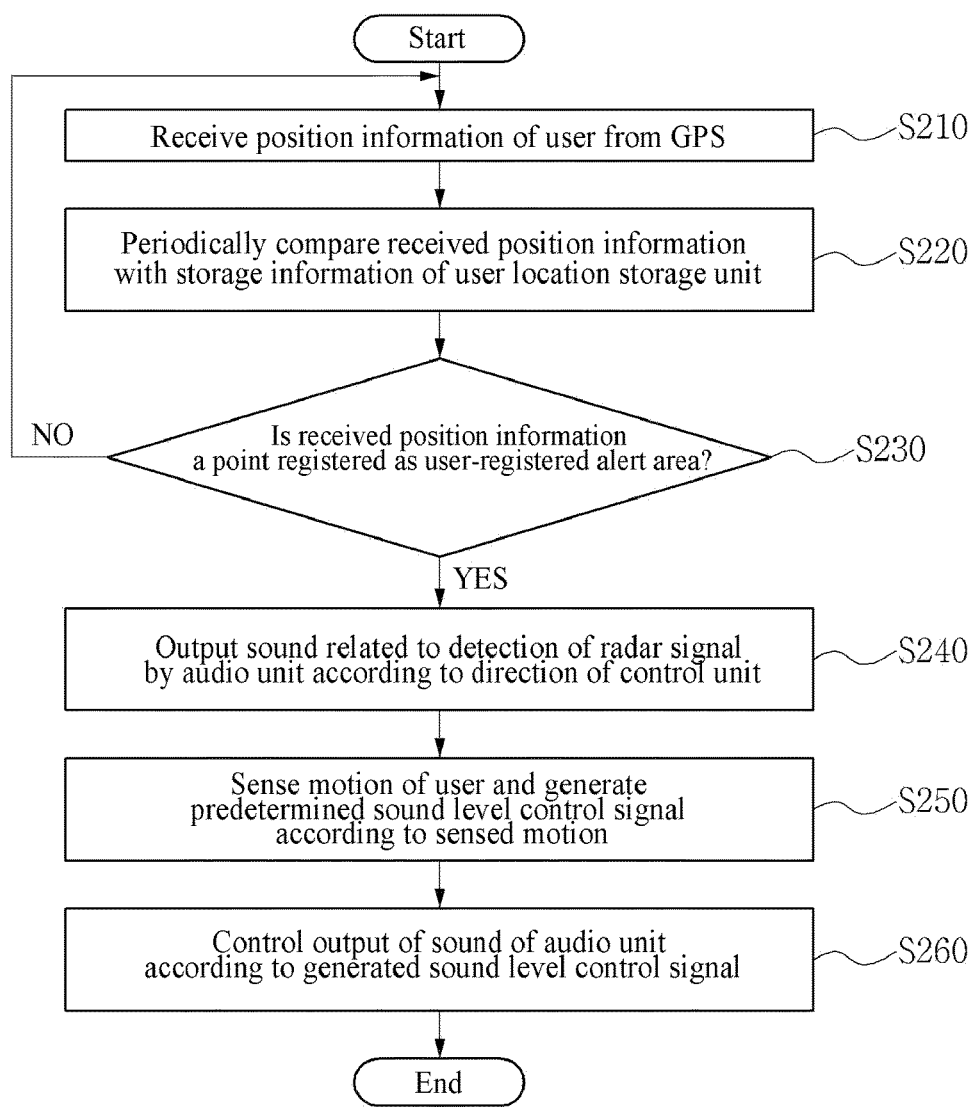
FIG. 9 is a flowchart illustrating the operation of a radar detector in a user-registered alert area.

FIG. 9 is a flowchart illustrating the operation of a radar detector in a user-registered alert area.

As shown in FIG. 9, first, the radar detector of the present invention receives position information through the GPS receiving unit 700*b* (step S210). Then, the radar detector transfers the received position information to the control unit 300.

The control unit 300 confirms whether or not the user is currently passing through the user-registered alert area by periodically comparing the position information received by the GPS receiving unit 700*b* with storage information (e.g., the user-registered alert area) of the user location storage unit (step S220).

If it is confirmed that the user is currently passing through the user-registered alert area, the control unit 300 outputs an aural message informing that the user is currently passing through a point where a speed meter or a safety alert transmitter is installed through the audio unit 500 regardless of whether or not the radar detector detects a radar signal (steps S230 and S240).

At this point, if the user (or the driver) takes an action of moving a hand or a specific motion near the sensor unit 800 to control (e.g., up/down or mute) the speaker sound of the audio unit 500, the sensor unit 800 senses the motion of the user and outputs a predetermined control signal according thereto (e.g., a signal for controlling the output level of the audio (e.g., an up/down command, a mute command or the like)) (step S250).

Then, the control unit 300 controls output of the sound of the audio unit 500 according to the control signal (e.g., a signal for controlling the output level of the audio) (step S260).

In addition, if the sensor unit 800 senses a motion of the user and generates a signal for registering an area, the control unit 300 registers the current position as a user-registered alert area. Contrarily, if the sensor unit 800 senses a motion of the user and generates a signal for deleting an area, the control unit 300 deletes storage information of the user location storage unit which stores the current position as a user-registered alert area.

<GPS(POI)-Based Alert Rejection Area Using Motion>

FIG. 10 is a flowchart illustrating the operation of a radar detector in a GPS-based false alert rejection area.

As shown in FIG. 10, first, the control unit 300 of the present invention loads information on the GPS-based alert rejection area from the storage unit 900. In addition, the control unit 300 confirms whether or not the user is currently passing through the point of interest by periodically comparing the position information of the user received by the GPS receiving unit 700b with the point of interest (e.g., a point where a speed meter or a safety alert transmitter is installed) (steps S310 and S320).

If it is confirmed that the user is currently passing through the point of interest (POI), the control unit confirms whether or not the point of interest (POI) is a point where the speed meter or the safety alert transmitter is actually installed by checking whether or not the point of interest corresponds to the GPS-based alert rejection area (steps S330 and S340).

If the point of interest (POI) is not a point where the speed meter or the safety alert transmitter is actually installed as a result of the confirmation, i.e., the point of interest (POI) corresponds to the GPS-based alert rejection area, the control unit 300 outputs an aural message informing that the user is currently passing through the point of interest (e.g., a point where a speed meter or a safety alert transmitter is installed) as a mute state through the audio unit 500 (step S380).

However, if the point of interest (POI) does not correspond to the GPS-based alert rejection area as a result of the confirmation, the control unit 300 outputs an aural message informing that the user is currently passing through the point of interest (e.g., a point where a speed meter or a safety alert transmitter is installed) through the audio unit 500 (step S350).

In addition, if the user (or the driver) takes an action of moving a hand or a specific motion near the sensor unit 800 to control (e.g., up/down or mute) the speaker sound of the audio unit 500, the sensor unit 800 senses the motion of the user and outputs a predetermined control signal according thereto (e.g., a signal for controlling the output level of the audio (e.g., an up/down command, a mute command or the like)) (step S360).

Then, the control unit 300 controls output of the sound of the audio unit 500 according to the control signal (e.g., a signal for controlling the output level of the audio) (step S370).

In addition, if the sensor unit 800 senses a motion of the user and generates a signal for registering an area, the control unit 300 registers the current position as a GPS-based alert rejection area. Contrarily, if the sensor unit 800 senses a motion of the user and generates a signal for deleting an area, the control unit 300 deletes storage information of the user location storage unit which stores the current position as a GPS-based alert rejection area.

Although the present invention has been described in the claims on the basis of radar detection, it includes even a case of a radar detector including laser detection as well as radar detection, which is intended to include technical spirits of the present invention.

For example, the audio unit is controlled to be silent while a radar detecting event is generated and handling of a user motion is sensed, and if the event situation of the radar detection is terminated, the audio is in a mute state until a next event situation of radar detecting occurs. At this point, the control unit 300 may or may not output an audio volume control command between termination of a previous event situation and termination of a next event situation, and since the control unit 300 of the present invention generates an audio output when a radar detecting event is generated, practically the same operation effect will be appeared in the speaker (SP).

On the other hand, the present invention may be programmed in the control unit 300 to control the operation of the radar detector in a control method of blocking output of a voice from the audio unit 500 by turning off only the power of the control unit 300 or turning off the entire power other than those of the control unit 300 and the radar detector in a digital on/off method for a predetermined period of time, and sensing the power as a standby power and automatically turning on the entire power when a next radar detecting situation occurs. In addition, the control unit 300 may control the output level of the audio unit to a mute state by blocking supply of power to the audio unit 500 for a predetermined period of time.

In addition, although the technical spirit of the present invention is described as a mute state in the claims, the concept of the mute state may include a volume decrease level as low as almost inaudible to a user, as well as complete mute.

In addition, although the present invention is illustrated to be limited to control output of a voice of the audio unit 500 through the sensor unit 800, the present invention can be applied by extending control targets to various kinds of devices attached to a vehicle, such as the display unit 400, a navigator and the like, in addition to the audio unit 500.

The control unit 300 according to the present can be implemented in a computer-readable recording medium using software, hardware or a combination of these.

According to hardware implementation, the control unit 300 described herein can be implemented using at least one of electrical units for performing the functions of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers and microprocessors. In some cases, the embodiments described in this specification can be implemented as the control unit 300 itself.

Although the present invention have been disclosed with reference to the embodiments shown in the figures only for illustrative purposes, those skilled in the art will appreciate that various modifications can be made therefrom and configured by selectively combining all or part of the embodiments described above. Therefore, the true scope of the present invention should be defined by the technical spirit of the appended claims.

As described above, the present invention implements a radar detector which can be easily handled by a vehicle driver while driving through a simple motion of a hand gesture without hindering safe driving of a vehicle when an output sound of sensing a radar (or a laser) is not needed.

In addition, the present invention implements a radar detector which can enhance convenience of using a product and guarantee safety of a user while driving by designing a new method and sensor device for switching an output sound of the radar detector to a mute state or reducing the output sound to a small sound of a predetermined level.

In addition, the present invention may correct malfunctions of a radar detector and allow a user to arbitrarily add (or delete) an alert rejection area or an alert area in an environment interfered by undesired signals, such as an area of severe radio interference, a downtown area where various signals are generated or the like, by additionally mounting a GPS receiving unit to the radar detector and utilizing position information of a GPS or a GLONASS.

The radar detector according to the present invention is expected to enhance convenience of a driver in handling the radar detector and contribute to safe driving by preventing traffic accidents.

The invention claimed is:

1. A radar detector comprising:
   a GPS receiving unit for receiving position information of a user;
   a radar unit for detecting a radar signal;
   a signal processing unit for converting, if the radar unit detects the radar signal, the detected radar signal into a digital signal;
   a control unit for determining whether or not the digital signal is a signal desired to be detected, by analyzing the received position information and the signal converted by the signal processing unit;
   a display unit for expressing a predetermined message related to detection of the radar signal or an operation performed by a GPS signal according to a direction of the control unit;
   an audio unit for outputting a sound according to the determination of the control unit;
   a sensor unit for sensing a motion of the user and generating a sound level control signal or a predetermined control signal according to the sensed motion; and
   a storage unit for storing information on a false alert rejection area, a GPS-based alert rejection area and a user-registered alert area,
   wherein the control unit turns up or down output of the sound of the audio unit according to the sound level control signal of the sensor unit, and newly registers or deletes information of the storage unit according to the predetermined control signal of the sensor unit, and
   wherein the sensor unit senses the motion of the user using an infrared human body sensing sensor for sensing the motion of the user based on changes of infrared signals.

2. The radar detector according to claim 1, wherein the storage unit includes:
   a first alert rejection area storage unit for storing information on areas determined by the user as if a radar signal is not detected although the radar signal is actually detected in a corresponding area (hereinafter, referred to as false alert rejection areas);
   a second alert rejection area storage unit for storing information on areas determined by the user as if the areas do not correspond to a point of interest (POI) although the corresponding areas are actually designated as a point of interest with reference to the position information of the GPS receiving unit (hereinafter, referred to as GPS-based alert rejection areas); and
   a user location storage unit for storing information on areas determined by the user that an alert is needed in the corresponding areas (hereinafter, referred to as user-registered alert areas).

3. The radar detector according to claim 1, wherein the control unit determines whether or not the digital signal is the signal desired to be detected, by analyzing the converted digital signal, loads information on the false alert rejection area from the storage unit, if the digital signal is determined as the signal desired to be detected, determines whether or not the user is currently passing through the false alert rejection area with reference to the received position information of the user, and outputs an audio signal of a mute state, if it is determined that the user is currently passing through the false alert rejection area.

4. The radar detector according to claim 1, wherein the control unit loads information on the user-registered alert area from the storage unit, periodically compares the received position information of the user with the user-registered alert area to confirm whether or not the user is currently passing through the user-registered alert area, and outputs the predetermined message informing that the user is currently passing through the user-registered alert area as an audio signal, regardless of whether or not the radar unit operates, if it is confirmed that the user is currently passing through the user-registered alert area.

5. The radar detector according to claim 1, wherein the control unit loads information on the GPS-based alert rejection area from the storage unit, confirms whether or not the user is currently passing through a point of interest (POI) with reference to the received position information of the user, determines whether or not the point of interest corresponds to the GPS-based alert rejection area, if the user is currently passing through the point of interest (POI), and outputs an audio signal of a mute state, if the point of interest corresponds to the GPS-based alert rejection area.

6. The radar detector according to claim 1, wherein the sensor unit includes:
   a sensor, as the infrared human body sensing sensor, for sensing the motion of the user occurring around the radar detector by detecting an infrared signal generated from a human body;
   an amplifier for amplifying the detected infrared signal; and
   a comparator for converting the amplified signal into a digital signal.

7. The radar detector according to claim 1, wherein the control unit controls an output level of the audio unit to a mute state by blocking supply of power of the audio unit for a predetermined period of time.

8. The radar detector according to claim 7, wherein when the control unit controls the output level of the audio unit to a mute state according to the sensed motion of the user, the output level of the mute state is maintained until a next motion of the user is sensed.

9. A sound control method of a radar detector, the method comprising the steps of:
receiving position information of a user through a GPS receiving unit;
converting, if a radar unit detects a radar signal, the detected radar signal into a digital signal;
determining, by a control unit, whether or not the digital signal is a signal desired to be detected, by analyzing the received position information and the converted digital signal;
outputting a predetermined message according to the determination of the control unit as an audio signal;
sensing, by a sensor unit, a motion of the user and generating a sound level control signal or a predetermined control signal according to the sensed motion; and
turning up or down, by the control unit, output of a sound of an audio unit according to the sound level control signal of the sensor unit, and newly registering or deleting information of a storage unit according to the predetermined control signal of the sensor unit,
wherein if the sensor unit employs an infrared human body sensing sensor, the step of generating the sound level control signal includes the steps of:
sensing, by the infrared human body sensing sensor, the motion of the user occurring around the radar detector by detecting an infrared signal generated from a human body;
amplifying the detected infrared signal; and
converting the amplified signal into a digital signal, and generating a predetermined sound level control signal.

10. The method according to claim 9, wherein the step of determining whether or not the digital signal is the signal desired to be detected includes the steps of:
determining whether or not the digital signal is the signal desired to be detected, by analyzing the converted digital signal;
loading, by the control unit, information on a false alert rejection area from the storage unit, if the digital signal is determined as the signal desired to be detected;
determining whether or not the user is currently passing through the false alert rejection area with reference to the received position information of the user; and
outputting, by the control unit, the audio signal of a mute state, if it is determined that the user is currently passing through the false alert rejection area.

11. The method according to claim 9, wherein the step of determining whether or not the digital signal is the signal desired to be detected includes the steps of:
loading, by the control unit, information on a user-registered alert area from the storage unit;
periodically comparing the received position information of the user with the user-registered alert area to confirm whether or not the user is currently passing through the user-registered alert area; and
outputting the predetermined message informing that the user is currently passing through the user-registered alert area as the audio signal, regardless of whether or not the radar unit operates, if it is confirmed that the user is currently passing through the user-registered alert area.

12. The method according to claim 9, wherein the step of determining whether or not the digital signal is the signal desired to be detected includes the steps of:

loading, by the control unit, information on a GPS-based alert rejection area from the storage unit;
confirming whether or not the user is currently passing through a point of interest (POI) with reference to the received position information of the user;
determining whether or not the point of interest corresponds to the GPS-based alert rejection area, if the user is currently passing through the point of interest (POI); and
outputting, by the control unit, the audio signal of a mute state, if the point of interest corresponds to the GPS-based alert rejection area.

13. The method according to claim 9, wherein if the sensor unit employs an infrared human body sensing sensor, the step of generating the sound level control signal includes the steps of:
generating, by a pulse generation unit, a pulse of a regular interval for on and off of an infrared LED;
increasing, by a current booster, current applied to the LED for smooth operation of the LED;
emitting, by a proximity sensing photo sensor, an infrared LED ray, sensing an infrared (IR) optical pulse reflected and returning from a body of a driver, converting the IR optical pulse into voltage and outputting the voltage;
amplifying the output voltage of the proximity sensing photo sensor; and
converting the amplified signal into a digital signal.

14. The method according to claim 13, wherein the step of increasing current further includes the step of blocking the current applied to the LED to protect the LED by an LED protection unit when the generated pulse maintains a high value for a reference time period or longer.

15. A radar detector comprising:
a GPS receiving unit for receiving position information of a user;
a radar unit for detecting a radar signal;
a signal processing unit for converting, if the radar unit detects the radar signal, the detected radar signal into a digital signal;
a control unit for determining whether or not the digital signal is a signal desired to be detected, by analyzing the received position information and the signal converted by the signal processing unit;
a display unit for expressing a predetermined message related to detection of the radar signal or an operation performed by a GPS signal according to a direction of the control unit;
an audio unit for outputting a sound according to the determination of the control unit;
a sensor unit for sensing a motion of the user and generating a sound level control signal or a predetermined control signal according to the sensed motion; and
a storage unit for storing information on a false alert rejection area, a GPS-based alert rejection area and a user-registered alert area,
wherein the control unit turns up or down output of the sound of the audio unit according to the sound level control signal of the sensor unit, and newly registers or deletes information of the storage unit according to the predetermined control signal of the sensor unit, and
wherein the sensor unit senses the motion of the user using a proximity sensing photo sensor configured as a combination of a light transmitting element and a light receiving element.

16. The radar detector according to claim 15, wherein the sensor unit includes:
- a pulse generation unit for generating a pulse of a regular interval for on and off of an infrared light emitting diode (hereinafter, referred to as an LED);
- a current booster for increasing current applied to the LED for smooth operation of the LED;
- an LED protection unit for blocking the current applied to the LED to protect the LED when the generated pulse maintains a high value for a reference time period or longer;
- a sensor, as a proximity sensing photo sensor, for emitting an infrared LED ray, sensing an infrared (IR) optical pulse reflected and returning from a body of a driver, converting the IR optical pulse into voltage and outputting the voltage;
- an amplifier for amplifying the output voltage of the sensor; and
- a comparator for converting the amplified signal into a digital signal.

\* \* \* \* \*